Jan. 4, 1949.　　　T. C. ROTHFUS　　　2,458,101
LEAK DETECTOR
Filed Jan. 4, 1946

Inventor
TRUMAN C. ROTHFUS
By Milans Milans
Attorneys

Patented Jan. 4, 1949

2,458,101

UNITED STATES PATENT OFFICE 2,458,101

LEAK DETECTOR

Truman C. Rothfus, Des Moines, Iowa

Application January 4, 1946, Serial No. 638,971

5 Claims. (Cl. 73—40)

This invention relates to improvements in leak detectors and has for its object the provision of a device usable in various positions to disclose leaks of air or gas from structures such as pneumatic tires, inner tubes, life belts, rubber and similar boats, mattresses, cushions, footballs, etc., in the use of which, or in similar instances, it is desirable or necessary at times to test the valves or other portions of the device to ascertain the operating condition thereof.

Having in mind the wide application, or field of service to which the device is applicable, and to the end of a clear and full understanding of the invention, the same will be herein disclosed in the preferred embodiment thereof, designed primarily to check the valve structures of the automobile, airplane and other pneumatic tires. The said embodiment comprises a hollow or tubular transparent member whereby the interior contents thereof may be viewed, containing a drop or similar portion of mercury movable under pressure within the tube, the opposite ends of the tube being closed against the escape of the mercury, but not sealed against the passage of air. A portion of the tubular member intermediate of said ends is constituted by a return-bend formation so that the mercury in any of the various positions of application of the device may not gravitate and lodge in the remote end of the tube, where it will fail to give the indication desired to be represented by the movement of the mercury under the force of escaping air. The near or inlet end of the tube is formed or provided with means for contacting and sealing the engaging portions of the device and valve structure being tested, while the opposite or return-bend end of the device is formed or provided with means constituting an enlarged area within the tube in which the mercury, under pressure of leaking air may be lodged while permitting escape of the air to the exterior of the device.

From an understanding of the foregoing preferred embodiment of the invention, and a use thereof, as defined, the universal application of the device will be apparent. For example, by moving the device from place-to-place over a gas fitting or part to be tested, under sealing engagement therewith, any leaky condition may be ascertained, the physical characteristics of the device (its rigid transparent glass or equivalent plastic formation) facilitating manipulation thereof intact without necessitating any structural adjustment of its parts.

From the accompanying drawings, forming part hereof, wherein the above-mentioned preferred embodiment of the invention, together with an alternative embodiment thereof, are illustrated, the details of the same will be appreciated, when viewed in connection with the detailed description hereinafter contained.

In the drawings:

Figure 4 illustrates a slightly modified construction enabling the device to be applied by frictionally engaging a valve stem or the like.

Figure 1:
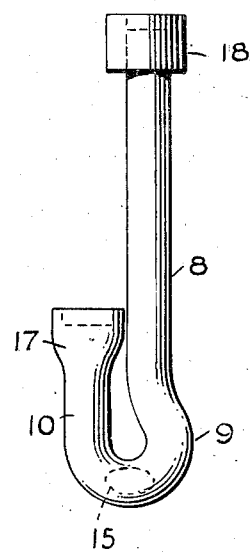
Figure 1 is a side elevation of the device as formed, in the main, from glass.

Referring more specifically to the drawings, wherein like reference characters designate the same parts in the respective series of views; and first with reference to the first three figures, 8 represents the main body portion of the device, the same being formed of clear transparent glass, into a hollow tubing having a curved or arcuate intermediate portion 9 leading to the return-bend or a backwardly extending portion 10 close to and parallel with the corresponding portion of the tube 8. The ends of the tubing are closed as at 11 and 12 by cotton or felt barriers 13 and 14, respectively, of a porous character which will permit the passage of air therethrough, but will prevent a drop or equivalent body of mercury 15, confined within the tubing, from escaping at either end of the latter. The return-bend formation of the tubing enables its useful application to any part to be tested, in various positions of the latter, without permitting said mercury to gravitate to the remote end 16 of the tubing without being affected by leaking air escaping through the tubing. The exhaust end of the tubing is expanded as at 17 to afford a correspondingly enlarged area considerably greater than the width of the space within the main portion of the tubing so that the mercury 15, when forced into said expanded area 17, will leave an unobstructed passageway around the mercury so that the air may have free passage to and through the barrier 12 to the exterior of the device.

The inlet end of the tubing 8 carries, and is surrounded by a rubber or elastic ring 18, projecting slightly beyond the end of the glass so that the same may be pressed against the abutting part of the device being tested, as the end of a valve stem and, under such pressure, sealing the same against the escape of air at the juncture therebetween. Similarly this rubber ring may be pressed against any surface of any devise over which the detector may be moved to ascertain the condition of the same so far as its retaining air or gas under pressure is concerned.

Figure 4:
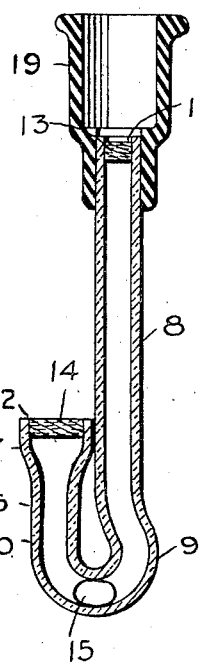

In some instances the rubber ring, just referred to, may be extended as illustrated in Figure 4 to provide an elastic sleeve 19 (Figure 4) to surround and embrace a nipple, such as a valve stem, to furnish a more secure hold of the device on the said stem.

Figure 3:
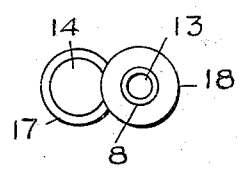
Figure 3 is an end view thereof.
Figure 5:
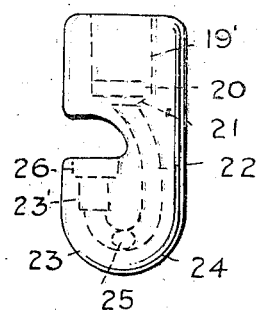
Figure 5 is an elevation of a plastic embodiment of the invention.
Figure 2:
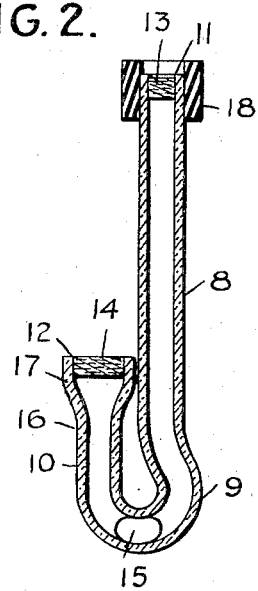
Figure 2 is a longitudinal section thereof.
Figure 6:
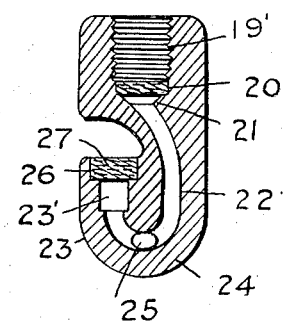
Figure 6 is a longitudinal section thereof.
Figure 7:
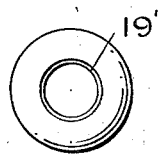
Figure 7 is an end view of the same.

Referring to the embodiment of the invention illustrated in Figures 5, 6 and 7, it will be seen that the structure is physically quite like the bent or molded glass form of Figures 1 to 3 inclusive, but in lieu of glass, the same is molded from a clear or transparent plastic to provide an interiorly threaded coupling portion 19' for threaded engagement with a tire valve stem or the like having at its lower end the felt or cotton barrier 20, across the inlet 21, to the longer branch of the conduit 22, leading to the shorter or return branch 23 thereof, the branches being connected by a gradually curved intermediate portion 24. The upper end of the conduit portion 23 opens to an enlarged chamber 23' to which the drop or body of mercury 25 may be forced by air under pressure, leaking from the article under test, to a position permitting said air to escape from around the mercury through the upper end 26 of the device to the atmosphere. The upper end has a porous barrier 27 of cotton or felt that will permit air to pass therethrough but at the same time prevent escape of the mercury from said end 26.

Of course, the threaded end or coupling 19', in this form of the testing device will usually eliminate the necessity for a rubber or like nipple as developed in connection with the previously described and preferred glass embodiment of the invention.

The several embodiments are herein disclosed to emphasize the optional formation of the tubing and the susceptibility thereof to the various uses herein referred to, it being observed that in the application of the detector to the device to be tested, the same may occupy a depending, upstanding, or lateral position without impairment of its operation.

In whatever connection the detector is used, any leak of air or gas will be indicated by the movement of the mercury in the transparent glass or other plastic conduit in a direction away from the article being tested and towards the air exit end of the device, it being understood that the drop or body of mercury is of predetermined size to always bridge the conduit transversely thereof and constitute a movable closer or piston in the conduit, progressively movable in advance of and under the pressure of leaking air or the like. Whatever the degree of leakage, the mercury will be moved and by such movement will give the indication of the defect sought.

I claim:

1. A leak detector comprising a body of rigid formation including parallel portions one relatively elongated and the other substantially shorter connected by an easy bend and having a continuous internal passage, a drop of mercury in said passage capable of being displaced by air or gas under pressure, and means at the free end of the elongated portion to have sealing contact with the device to be tested.

2. A leak detector comprising a body of rigid formation including parallel portions one relatively elongated and the other substantially shorter connected by an easy bend and having a continuous internal passage, a drop of mercury in said passage capable of being displaced by air or gas under pressure, means at the free end of the elongated portion to have sealing contact with the device to be tested, and an enlargement at the free end of the shorter portion affording a space to permit exhaust of air when the mercury is forced into said space.

3. A leak detector comprising a body of rigid formation including parallel portions one relatively elongated and the other substantially shorter connected by an easy bend and having a continuous internal passage, a drop of mercury in said passage capable of being displaced by air or gas under pressure, means at the free end of the elongated portion to have sealing contact with the device to be tested, and an enlargement at the free end of the shorter portion affording a space to permit exhaust of air when the mercury is forced into said space, both ends of the device being closed by barriers of a character to permit passage of air but confining the mercury against escape.

4. A leak detector comprising an integral body of glass of rigid formation including parallel portions one relatively elongated and the other substantially shorter connected by an easy bend and having a continuous internal passage, a drop of mercury in said passage capable of being displaced by air or gas under pressure, and means at the free end of the elongated portion to have sealing contact with the device to be tested.

5. A leak detector comprising an integral body of molded plastic material having formed therein a continuous passage comprising approximately parallel portions one relatively elongated and the other substantially shorter opening in the same general direction at their free ends and connected by an easy bend, a drop of mercury in said passage capable of being displaced by air or gas under pressure, and means at the free end of the elongated portion to have sealing contact with the device to be tested.

TRUMAN C. ROTHFUS.

REFERENCES CITED

The following references are of record in the file of this patent:

UNITED STATES PATENTS

| Number | Name | Date |
|---|---|---|
| 803,786 | Ramsberger | Nov. 7, 1905 |
| 1,571,657 | Wilkinson | Feb. 2, 1926 |

OTHER REFERENCES

A publication, namely Fig. 1 and the description thereof in the Review of Scientific Instruments, November 1942, page 504.